L1l 16111111101 1111111211 11161101 111 111 11111 17 111151 11111111 11111 1111 1111 1111 1111

(12) United States Patent
Jiang et al.

(10) Patent No.: US 7,346,106 B1
(45) Date of Patent: Mar. 18, 2008

(54) ROBUST MULTI-PASS VARIABLE BIT RATE ENCODING

(75) Inventors: Wenqing Jiang, San Jose, CA (US); Jian Lu, Sunnyvale, CA (US); Gregory K. Wallace, Palo Alto, CA (US); Peter Chou, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 808 days.

(21) Appl. No.: 10/751,345

(22) Filed: Dec. 30, 2003

(51) Int. Cl.
*H04N 7/12* (2006.01)

(52) U.S. Cl. .................................. 375/240.12

(58) Field of Classification Search ............... 348/405, 348/419, 384, 390, 400, 401, 402; 386/111, 386/112, 126, 124, 125; 375/240.03, 240.12, 375/240.01, 240.16, 240.24
See application file for complete search history.

(56) References Cited

U.S. PATENT DOCUMENTS 6,198,878 B1 * 3/2001 Blawat et al. ............... 386/111

2005/0058200 A1 * 3/2005 Lu et al. ................ 375/240.12

* cited by examiner

*Primary Examiner*—Tung Vo
*Assistant Examiner*—Behrooz Senfi
(74) *Attorney, Agent, or Firm*—Fenwick & West LLP (57) ABSTRACT

An encoding manager performs a first-pass encoding of a video sequence, collecting modeling data concerning the sequence in the process. The encoding manager utilizes collected data to construct a model concerning the sequence, the model including bit overhead for each frame and data concerning transitions that occur during the sequence. The encoding manager uses the data model to generate a rate profile for the video sequence, avoiding buffer underflow by allocating bits from hard to easy segments as needed. The encoding manager utilizes the rate profile to perform a second-pass encoding of the video sequence, adjusting quantization and bit rate for frames as necessary to avoid underflow and conform to the bit budget for the video sequence.

32 Claims, 5 Drawing Sheets

ROBUST MULTI-PASS VARIABLE BIT RATE ENCODING

BACKGROUND

1. Field of Invention

The present invention relates generally to video encoding, and more specifically to multi-pass variable bit rate encoding.

2. Background of Invention

Encoded digital video, such as video encoded according to the Moving Picture Expert's Group Version 2 ("MPEG2") standard and stored on a Digital Video Disk ("DVD"), is very commercially popular today. Contemporary video encoders are expected to produce high quality results, and to offer a wide variety of user controls, such as multi-pass variable bit rate encoding. In multi-pass variable bit rate encoding, an encoder makes multiple passes through a video sequence in order to attempt to set optimized bit rates for the frames thereof.

Because the bit rate for video encoded on a DVD or similar medium can vary per frame, it is desirable to utilize variable bit rate encoding to maximize the output quality, as the number of bits needed to describe frames of a video sequence varies based on content and other factors. With fixed sized media, it is required to store an entire data image (e.g., a video sequence describing a film) in a fixed space (e.g., one side of a DVD). By varying the bit rate per frame such that individual frames are encoded at optimal bit rates, an attempt is made to maintain roughly constant quality throughout the video sequence.

For variable bit rate encoding, it is desirable for the encoder to make multiple passes through the video sequence. Because the bit rate of different frames will vary as a function of frame complexity, the encoder can build a frame complexity profile during the first-pass, and then encode the sequence according to the complexity profile during a second-pass.

Multi-pass variable bit rate encoding is known, but requires a trade off between encoding a video sequence at a target average bit rate (e.g., encoding a video sequence to fit on one side of a DVD) and the quality of the encoded video sequence. Multi-pass variable bit rate encoding as it exists in the prior art reduces the bit rate of complex frames by lowering the quality of those frames as needed to hit a target average rate. Unfortunately, this results in inconsistent quality across the video sequence as a whole, because more complex frames are encoded for lower quality than that of less complex frames.

What is needed are robust multi-pass variable bit encoding methods, systems and computer program products that allow encoding of a video sequence at a target average bit rate while still maintaining a substantially consistent quality across the video sequence as a whole.

SUMMARY OF INVENTION

An encoding manager facilitates robust multi-pass variable bit rate video encoding of a video sequence. In one embodiment of the present invention, the encoding manager performs a first-pass encoding of the video sequence, collecting modeling data concerning the video sequence in the process. The encoding manager utilizes collected modeling data to construct a data analysis model concerning the video sequence. The data analysis model includes a frame model which expresses a mathematical relationship between frame bit rate, frame complexity, frame quantization (quant) and frame bit overhead for each frame of the video sequence. The data analysis model also includes a sequence model, which specifies transitions that occur during the video sequence.

The encoding manager utilizes the data analysis model to generate a rate profile for the video sequence. The rate profile complies with the bit budget for the video sequence, and avoids buffer underflow for each frame of the video sequence. In order to avoid buffer underflow, the encoding manager distinguishes between easy and hard segments of the video sequence, and re-allocates bits from hard to easy segments as needed to avoid underflow, thereby spreading any required quality loss across the entire segment in which the underflow occurs. The encoding manager then utilizes the rate profile to perform a second-pass encoding of the video sequence, adjusting quantization (Q) and bit rate for frames as necessary to avoid underflow and conform to the bit budget for the video sequence.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
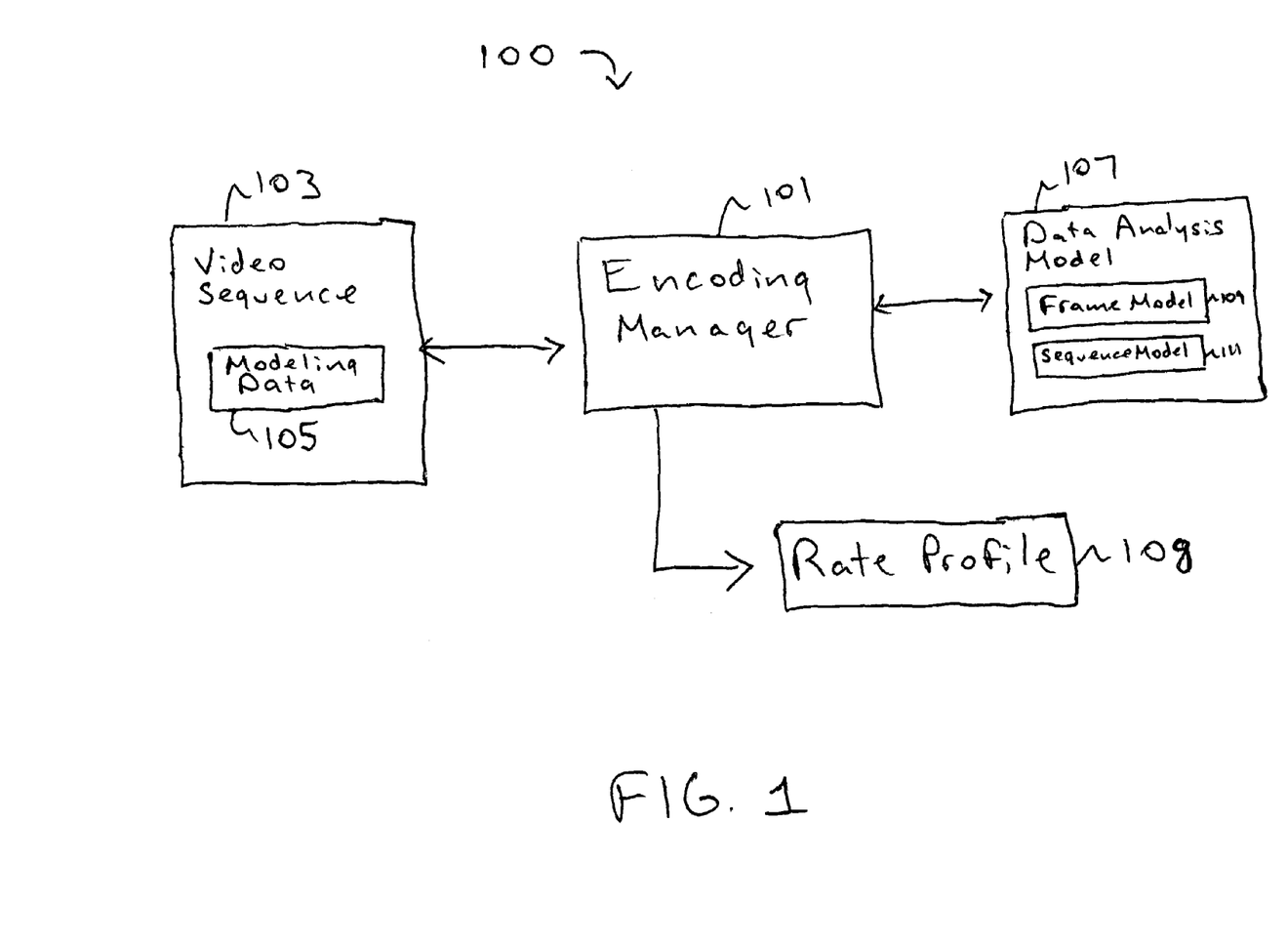
FIG. 1 is a block diagram, illustrating a high level overview of a system for practicing some embodiments of the present invention.

FIG. 1 illustrates a high level overview of a system 100 for performing some embodiments of the present invention. An encoding manager 101 performs a first-pass encoding of a video sequence 103, and collects data 105 concerning the video sequence 103. It is to be understood that although the encoding manager 101 is illustrated as a single entity, as the term is used herein an encoding manager 101 refers to a collection of functionalities which can be implemented as software, hardware, firmware or any combination of the three. Where an encoding manager 101 is implemented as software, it can be implemented as a standalone program, but can also be implemented in other ways, for example as part of a larger program, as a plurality of separate programs, or as one or more statically or dynamically linked libraries.

The implementation mechanics of performing the first-pass encoding of the video sequence 103 and collecting the data 105 thereon will be apparent to those of ordinary skill in the relevant art in light of this specification. For example, in one embodiment, the encoding manager 101 performs the first-pass encoding of the video sequence 103 by encoding the video sequence 103 with a constant Q, without any rate control. In another embodiment, the encoding manager 101 performs the first-pass encoding of the video sequence 103 by encoding the video sequence 103 utilizing one pass variable bit rate encoding, thereby attempting to achieve a target bit rate. In yet other embodiments, the encoding manager 101 performs the first-pass encoding of the video sequence 103 by encoding the video sequence 103 utilizing one pass constant bit rate encoding.

Regardless of the first-pass encoding methodology utilized, the encoding manager 101 collects data 105 concerning the video sequence 103 to utilize to construct a data analysis model 107, to be used to generate a rate profile 108 as described in greater detail below. What data 105 concerning the video sequence 103 to collect is a function of the specific data analysis model 107 that the encoding manager 101 will construct. Examples of collected data 105 points concerning a video sequence 103 include but are not limited to a picture type (e.g., I frame, P frame or B frame), frame bit total, frame DCT bit total, average frame mquant (average macroblock q for that frame), average frame activity, scene change indication, fade indication, still frame indication and transition indication. Other examples will be readily apparent to those of ordinary skill in the relevant art in light of this specification.

The encoding manager 101 uses collected data 105 concerning the video sequence 103 to construct a data analysis model 107 which includes both a frame model 109 concerning each frame of the video sequence 103, and a sequence model 111 concerning the video sequence 103 as a whole. The frame model 109 can be instantiated as a formula expressing a mathematical relationship between frame bit rate, frame complexity, frame quant and frame bit overhead for each frame of the video sequence 103. Specifically, the encoding manager 101 can use the formula $$R=C/Q+A \quad (1)$$

as the frame model 109, where R equals frame bit rate, C equals frame complexity, Q equals frame quant and A equals the number of overhead bits for the frame. The encoding manager 101 can use data 105 gleaned from the first-pass encoding to calculate constants C and A for each frame of the video sequence 103. A, the overhead bit value for a frame, can be calculated as total bits for the frame minus DCT bits for the frame. C, the complexity value for a frame, can be calculated as DCT bits for the frame times Q for the frame. The encoding manager 101 can then utilize the calculated constants C and A to solve for R for a given Q or vice versa for each frame according to the frame model 109 or more specifically Equation (1), during the process of rate profile 108 generation, as described in greater detail below. It is to be understood that in other embodiments, the encoding manager 101 can construct the frame model 109 according to other methodologies as desired, for example by using the popular TM5 reference model.

The encoding manager 101 can also utilize collected data 105 concerning the video sequence 103 to construct a sequence model 111 concerning the video sequence 105 as a whole. The sequence model 111 identifies transitions in the video sequence 103, and is used by the encoding manager 101 during the rate profile 108 generation. The sequence model 111 utilizes collected data 105 such as average frame activity, scene change indication, fade indication, still frame indication and transition indication to identify sequence transitions that can be leveraged during rate profile 108 generation to determine proper bit rates for affected frames. The implementation mechanics of detecting transitions in a video sequence 103 are known to those of ordinary skill in the relevant art.

Figure 2:
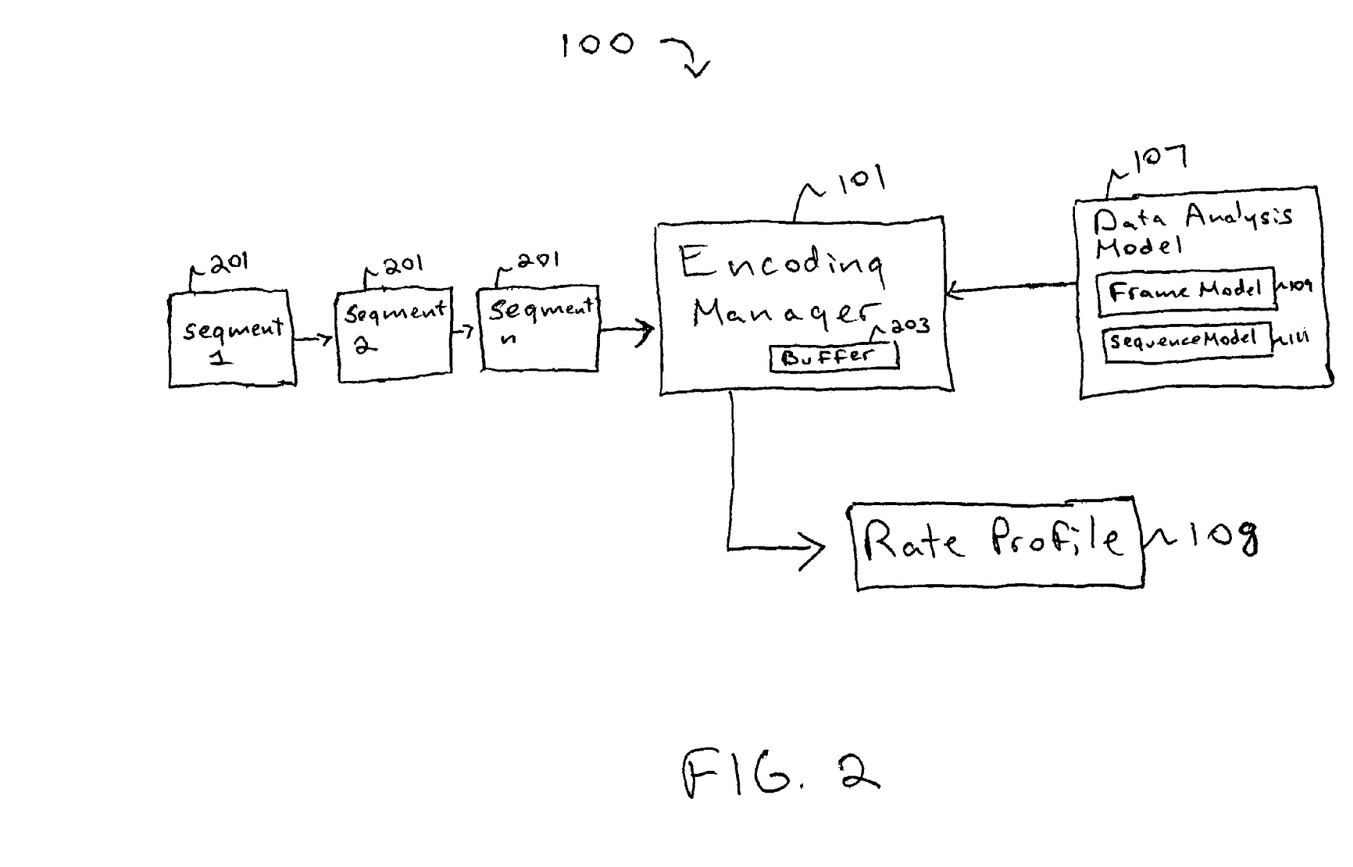
FIG. 2 is a block diagram, illustrating an encoding manager using a data analysis model to generate a rate profile for encoding a video sequence, according to one embodiment of the present invention.

Turning to FIG. 2, the encoding manager 101 is illustrated using the data analysis model 107, including the frame model 109 and the sequence model 111, to generate a rate profile 108 for encoding the video sequence 103, according to one embodiment of the present invention. The rate profile 108 is an allocation of bits per frame such that the sum thereof equals the bit budget for the video sequence 103. To optimize quality of the encoded video sequence 103, the rate profile 108 can distinguish between easy and hard segments 201 of the video sequence 103, and allocate bits to segments 201 as a function of segment 201 complexity, within the constraints of the total bit budget for the sequence 103. The rate profile 108 also allocates bits so as to avoid buffer 203 underflow for each frame of the video sequence 103.

In order to generate the rate profile 108, the encoding manager 101 calculates an initial Q for the video sequence 103, as a function of the sum of the frame complexity (C) for each frame (i) of the video sequence 103, the sum of the bit overhead (A) for each frame of the sequence 103, and the bit budget (B) for the sequence 103. Specifically, the encoding manager 101 can calculate the initial Q by solving for Q in the expression $$\Sigma\Sigma_i(C_i/Q+A_i)=B \quad (2)$$

Recall that the encoding manager 101 gleaned $C_i$ and $A_i$ for each frame i during the first-pass of the encoding, and that B is known for the video sequence 103. Thus, the encoding manager 101 can solve for Q from Equation (2).

In some embodiments, the encoding manager takes into account the difference between I, P and B frames, by calculating a separate initial Q for each type of frame, denoted by QI, QP, and QB, respectively, based on a common base Q. If the ratios QI/Q, QP/Q, and QB/Q are known, the encoding manager 101 can calculate QI, QP and QB by first solving the base Q from Equation (2) and obtaining QI, QP and QB based on the known ratios. For example, QI could be set to Q, QP to 1.5Q and QB to 3Q. These values can then be plugged into Equation (2) depending on the frame type of frame (i) to solve for Q. Subsequently, QI, QP, and QB are obtained by multiplying the set ratios to Q. Of course, other values of the ratios are possible, and they can be changed dynamically throughout the video sequence 103 as desired. In some embodiments, the same initially calculated Q is used for all frame types.

Once the encoding manager 101 has calculated the initial Q (or Qs) to use, the encoding manager 101 can then solve for R (the frame bit rate) for each frame of the sequence 103, 103 by substituting the calculated Q and the constants C and A gleaned during the first pass into the frame model 109 described by Equation (1).

In some instances, the encoding manager 101 makes adjustments to the calculated R for at least some frames. Specifically, it is generally required to meet some minimum number of bits per frame (the specific minimum is a function of various criteria, and the mechanics of determining such a minimum are known to those of ordinary skill in the relevant art). Where $R_i$ for any frame i is less than the minimum number of bits per frame, $R_i$ is set to equal the minimum. Additionally, if $R_i$ for any frame i is less than or equal to $A_i$ for that frame, Q would be negative which is not allowed. Therefore, under such circumstances, $R_i$ for that frame is increased accordingly.

It is also desirable to adjust $R_i$ for transition frames in the video sequence 103 (e.g., frames that comprise scene changes, fades, etc.). Recall that the encoding manager 101 gleaned transition data 105 concerning the video sequence 103 during the first-pass, and built a sequence model 111 identifying transitions in the video sequence 103. In some embodiments, this sequence model 111 is now used to adjust $R_i$ for transition frames, for example according to a formula whereby extra bits are allocated to such frames. The specific formula (s) to use are a design choice, and can vary from transition type to transition type if desired. For example, $R_i$ for a frame comprising a fade can be multiplied by a fade constant which is greater than one, whereas a frame comprising a scene change can be multiplied by a scene change constant (again, greater than one). In some embodiments, all transition frames can be multiplied by a single transition constant. Other methods can be used as desired to allocate extra bits to transition frames, the implementation mechanics of which will be apparent to those of ordinary skill in the relevant art in light of this specification.

Once the encoding manager 101 has calculated $R_i$ for each frame i, the encoding manager 101 has an initial rate profile 108 for the video sequence 103. The encoding manager 101 determines whether encoding the sequence 103 according to this initial profile 108 causes buffer 203 underflow by any frame. To so determine (and correct if necessary), the encoding manager 101 simulates decoding of the video sequence 103 according to the initial rate profile 108. During the simulated decoding, the encoding manager 101 determines whether any frames underflow the buffer 203, or overflow the buffer 203. The rate profile 108 will be corrected for any frames that underflow the buffer 203, and information concerning which frames overflow the buffer 203 is used in the correction processes, as described below.

In order to fix any buffer 203 underflow, the encoding manager 101 divides the video sequence 103 into multiple segments 201. A segment 201 as used herein is a set of contiguous frames which transition the buffer 203 from one state to another. The buffer 203 is assumed to be full at the beginning of the sequence 103; so the possible state transition for each segment 201 are beginning (full) to full, beginning (full) to empty, beginning (full) to end, full to empty, full to full or full to end. The encoding manager 101 classifies segments 201 of the video sequence as easy or hard. In one embodiment, any segment 201 that transitions the buffer 203 from full (overflow) to empty (underflow) is classified as hard, whereas all other segments 201 are classified as easy.

In order to eliminate buffer 203 underflow, the encoding manager 101 calculates an updated Q for each hard segment 201, so as to avoid the underflow at the end of that hard segment 201. Prior art encoding would typically correct frames that cause underflow by either dropping the frame altogether, which negatively affects the quality of the video sequence 103, or by encoding that frame with a higher Q so as to allocate fewer bits to the frame and thus avoid the underflow. However, re-encoding the individual underflow causing frame with a higher Q negatively affects the quality of that frame and thus the video sequence 103.

By addressing buffer 203 underflow by calculating an updated Q for each frame of the entire hard segment 201 that includes an underflow causing frame, the encoding manager 101 spreads the quality loss required to avoid the underflow across a segment 201 of frames. This minimizes the negative effect on any single frame of the video sequence 103. In one embodiment, in order to calculate an updated Q for a given hard segment 201, the encoding manager 101 recalculates an updated bit budget $R_{hard}$ for each hard segment 201 by subtracting the number of bits that the buffer 203 is underflowed (U) in that hard segment 201 from the original bit budget rate ($R_{original}$) for that segment 201 ($R_{hard}=R_{original}-U$). It is to be understood that variations on the above formula can be used to modify R for hard segments 201 as desired, with the commonality being that the quality loss resulting from removing the underflow bits U from the segment is distributed between at least some of the frames of that segment 201.

Once an updated R value is calculated for a hard segment 201, the encoding manager utilizes the updated R value to calculate an updated Q for that hard segment 201, by replacing R for B and plugging in the known $C_i$ and $A_i$ into Equation (2). In this way, Q is updated so as to avoid the underflow of that hard segment 201. In some embodiments that employ different QI, QP and QB for I, P, and B frames, respectively, but the ratios QI/Q, QP/Q, and QB/Q are known, the encoding manager 101 also calculates updated QI, QP, and QB for the hard segment 201 based on the known ratios and the base Q that can be solved in the same way as described above.

The encoding manager 101 thus calculates an updated Q (and in some embodiments QI, QP and QB) for each hard segment 201 of the video sequence, keeping track of the total number of bits subtracted from that hard segment 201. This bit total can then be added to the bit budget for the easy segments 201, and the updated bit budget used to calculate an updated Q for the easy segments 201 (in other words, the video sequence 103 absent the hard segments 201), according to methodology for calculating Q described above. In some embodiments, the encoding manager 101 also calculates a separate QI, QP and QB for the easy segments.

At this point, the encoding manager 101 has a separate updated Q for each hard segment 201, and a common updated Q for all easy segments 201. The encoding manager 101 reformulates the initial rate profile 108 for the video sequence 103, based on the updated Qs for each hard segment 201 and the updated Q for the easy segment 201.

Figure 3:
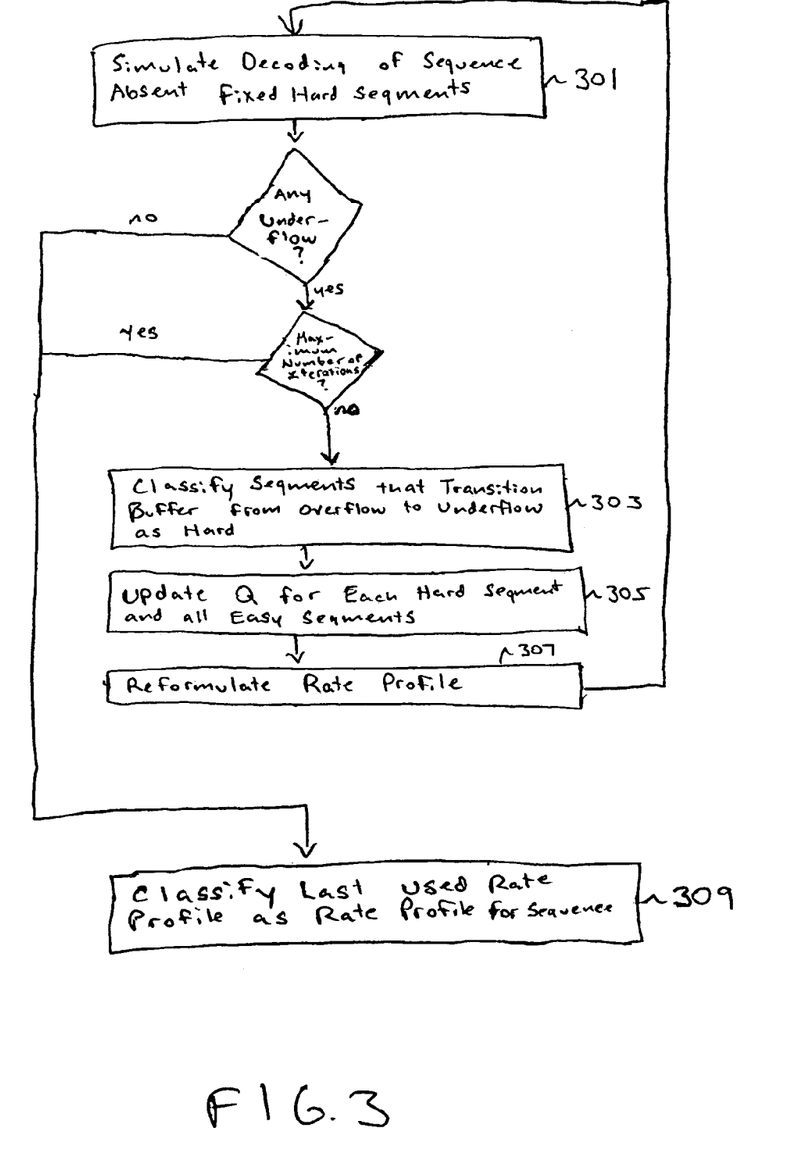
FIG. 3 is a flowchart, illustrating steps for the encoding manager to detect and fix newly introduced hard segments, according to some embodiments of the present invention.

As discussed above, in the processes of updating Q for easy segments 201, the encoding manager 101 adds bits to those segments 201, thereby creating the possibility of introducing new buffer 203 underflow (in other words, creating new hard segments 201). FIG. 3 illustrates iterative steps which are employed by the encoding manager 101 in some embodiments of the present invention to detect and fix newly introduced hard segments 201. In each iteration, the encoding manager 101 simulates decoding 301 of the video sequence 103 absent any previously detected and fixed hard segments, according to the most recently reformulated rate profile 108. In other words, the encoding manager 101 simulates decoding 301 all of the easy segments as encoded according to the rate profile 108 reflecting the most recently updated Q for the easy segments 201. If the simulated decoding does not result in any underflow, the encoding manager 101 classifies 309 the rate profile 108 as the generated rate profile 108 for the video sequence 103. Otherwise, the encoding manager proceeds to step 303. During the simulated decoding, the encoding manager 101 identifies frames that underflow or overflow the buffer 203 as described above, and classifies 303 any segments 201 that transition the buffer 203 from overflow to underflow as hard. The encoding manager updates 305 Q for each hard segment 201 and Q for all remaining easy segments 201 as described above. The encoding manager 101 proceeds to reformulate 307 the rate profile 108 based on the updated Qs. The encoding manager 101 repeats steps 301-307 until a simulated decoding of the video sequence 103 according to an initial rate profile 108 results in no hard segments 201, or until a maximum number of iterations has been executed. At this point, the encoding manager 101 classifies 309 the last rate profile 108 used to simulate decoding of the video sequence 103 as the generated rate profile 108 for the video sequence 103, and proceeds to the second-pass encoding.

Figure 4:
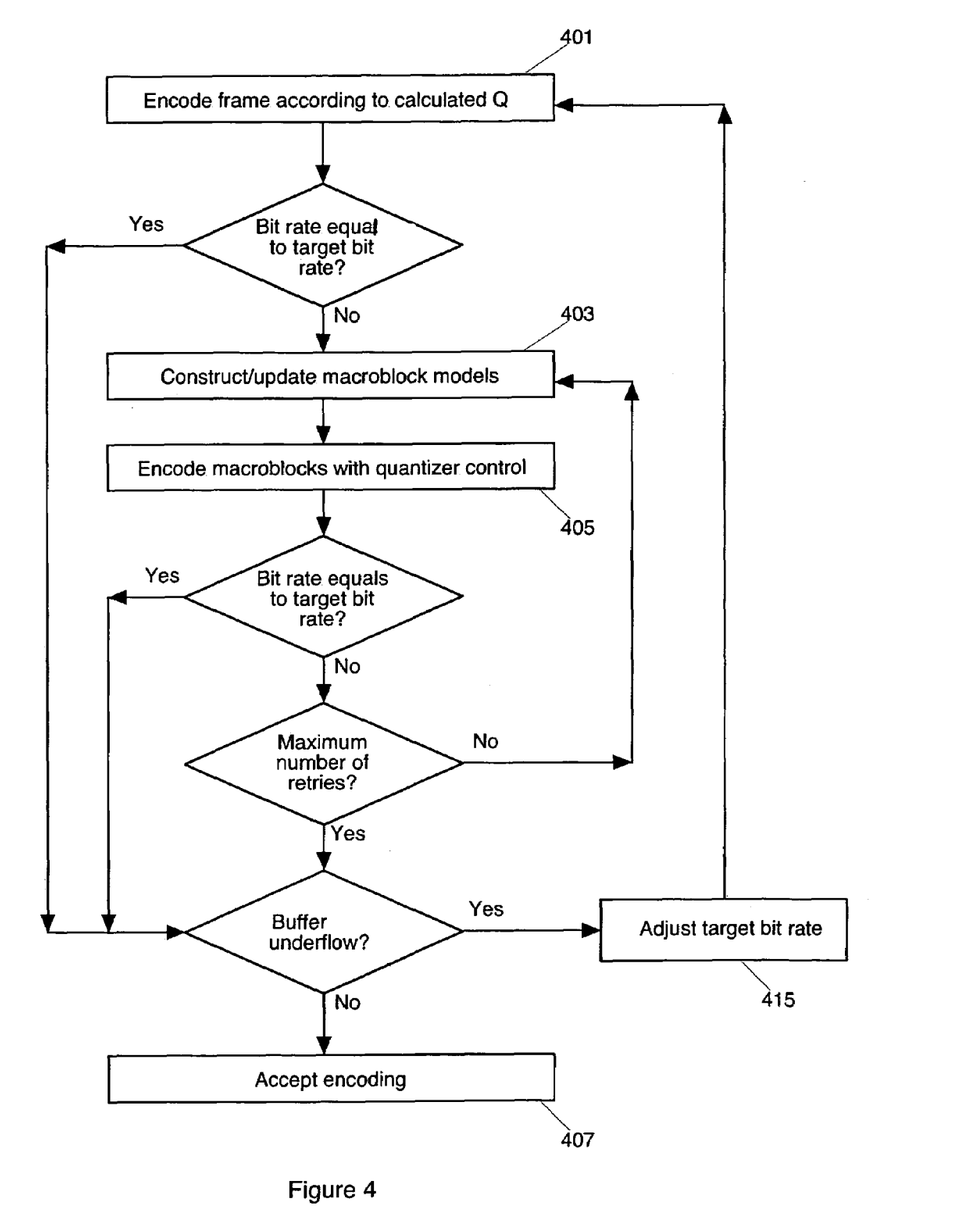
FIG. 4 is a flowchart, illustrating steps for the encoding manager to utilize the rate profile to perform a second-pass encoding of the video sequence, according to one embodiment of the present invention.

FIG. 4 illustrates the encoding manager 101 utilizing the rate profile 108 to perform a second-pass encoding of the video sequence 103, according to one embodiment of the present invention. The encoding manager 101 encodes 401 each frame of the video sequence 103 according to the Q calculated for that frame by the encoding manager 101 during the generation of the rate profile 108. The encoding manager 101 determines, for each frame of the video sequence, whether the bit rate for a frame encoded according to its Q from the rate profile 108 is equal to the bit rate calculated for that frame by the encoding manager 101 during rate profile 108 generation, plus or minus a margin of error. If so, the encoding manager 101 proceeds to determine if the current encoding causes a buffer 203 underflow.

Where the calculated Q for a frame does not result in an actualized bit rate within a margin of error of the calculated bit rate from the rate profile 108, the encoding manager 101 employs quantizer control at a macroblock level in order to produce an actualized bit rate within the margin of error of the rate profile 108 bit rate. Specifically, the encoding manager 101 constructs 403 a macroblock model for each macroblock of the frame. A macroblock model consists of a formula similar to Equation (1) expressing a mathematical relationship between bit rate, complexity, quant and bit overhead at a macroblock level. In one embodiment, the model is expressed as $r_i = c_i/q_i + a_i$ as described with Equation (1) for frames, except that the model is applied at a macroblock level, as represented here by the use of lowercase letters. In other embodiments, other models can be applied as desired, for example the popular TM5 reference model.

Where $r_i = c_i/q_i + a_i$ is used as the model, $r_i$ equals the bit rate for macroblock i, $c_i$ equals the complexity of the macroblock, $q_i$ equals the quant for the macroblock (sometimes called the mquant) and $a_i$ equals the bit overhead for the macroblock. Similar to the process of calculating $C_j$ and $A_j$ from data 105, $c_i$ and $a_i$ can be calculated from data collected from the first attempt of the second-pass encoding 401. More specifically, $a_i$ can be calculated as total bits for the macroblock minus DCT bits for the macroblock i, and $c_i$ can be calculated as DCT bits for the macroblock i multiplied by the mquant used. These calculated values for $a_i$ and $c_i$ are then used in the model.

To encode macroblocks with quantizer control 405, the encoding manager 101 calculates an updated $q_i$, for each macroblock to be encoded. In one embodiment, the updated $q_i$ is calculated for a macroblock as a function of base $q_b$ for the macroblocks of the frame remaining to be encoded and the activity mask for the macroblock i for which the updated $q_i$ is being calculated. Specifically, the updated $q_i$ is calculated as $q_i = q_b * \text{mask}[i]$, where $q_b$ equals a base q for the macroblocks of the frame remaining to be encoded, and mask[i] equals the activity mask of the macroblock. For the first macroblock in a frame, $q_b$ can initially be calculated based on the initial bit rate for the frame as a whole (R). Because $\Sigma\Sigma_i(r_i) = R$ and $r_i = c_i/q_i + a_i$ and $q_i = q_b * \text{mask}[i]$, by substitution $\Sigma\Sigma_i(c_i/q_b * \text{mask}[i] + a_i) = R$. The encoding manager 101 knows R for the current frame and $c_i$ and $a_i$ for each and every macroblock in that frame. The encoding manager 101 can also use methods known to those of ordinary skill in the relevant art to compute mask[i] for the macroblock. Thus, the only unknown is $q_b$, which the encoding manager solves for, and then uses along with mask[i] to calculate an updated $q_i$ for the macroblock by solving for $q_i$ in the equation $q_i = q_b * \text{mask}[i]$. The updated $q_i$ is subsequently used along with $c_i$ and $a_i$ to calculate an updated $r_i$ for the macroblock by solving for $r_i$ in the equation $r_i = c_i/q_i + a_i$. Then, the encoding manager 101 encodes 405 the current macroblock using $q_i$, collecting updated modeling data in the process.

According to one embodiment of the current invention, after encoding 405 each macroblock using the updated $r_i$ and $q_i$, the encoding manager 101 updates $q_b$ for the macroblocks of the frame remaining to be encoded. To do so, the encoding manager calculates or updates a value R' which is equal to R for the frame minus the sum of the bits of the macroblocks encoded so far. Then, the encoding manager calculates an updated $q_b$ by using the equation $\Sigma\Sigma_i(c_i/q_b * \text{mask}[i] + a_i) = R'$, where $\Sigma\Sigma_i$ represents the sum of each macroblock i which has not yet been encoded. The encoding manager 101 can thus encode 405 each macroblock using an updated $r_i$ and $q_i$, and then update $q_b$ and R' accordingly.

If the encoding of each macroblock of the frame with quantizer control is such that the bit rate for the frame is within a margin of error of the bit rate calculated for that frame by the encoding manager 101 during rate profile 108 generation, then the encoding manager 101 proceeds to determine if the current encoding causes a buffer 203 underflow. Otherwise, the encoding manager 101 repeats steps 403-405 with updated modeling data gleaned during the last encoding, until the encoding is such that the bit rate for the frame is within a margin of error of the bit rate calculated for that frame by the encoding manager 101 during rate profile 108 generation, or until the encoding manager 101 has encoded 405 the frame a maximum number of times. At this point, the encoding manager proceeds to determining 413 if the current encoding causes a buffer 203 underflow.

In some embodiments, if the encoding manager 101 has determined the current encoding does cause a buffer 203 underflow, the encoding manager 101 adjusts 415 the bit rate for the current frame accordingly as a corrective measure, and re-encodes the frame by repeating steps 401 through 407.

Figure 5:
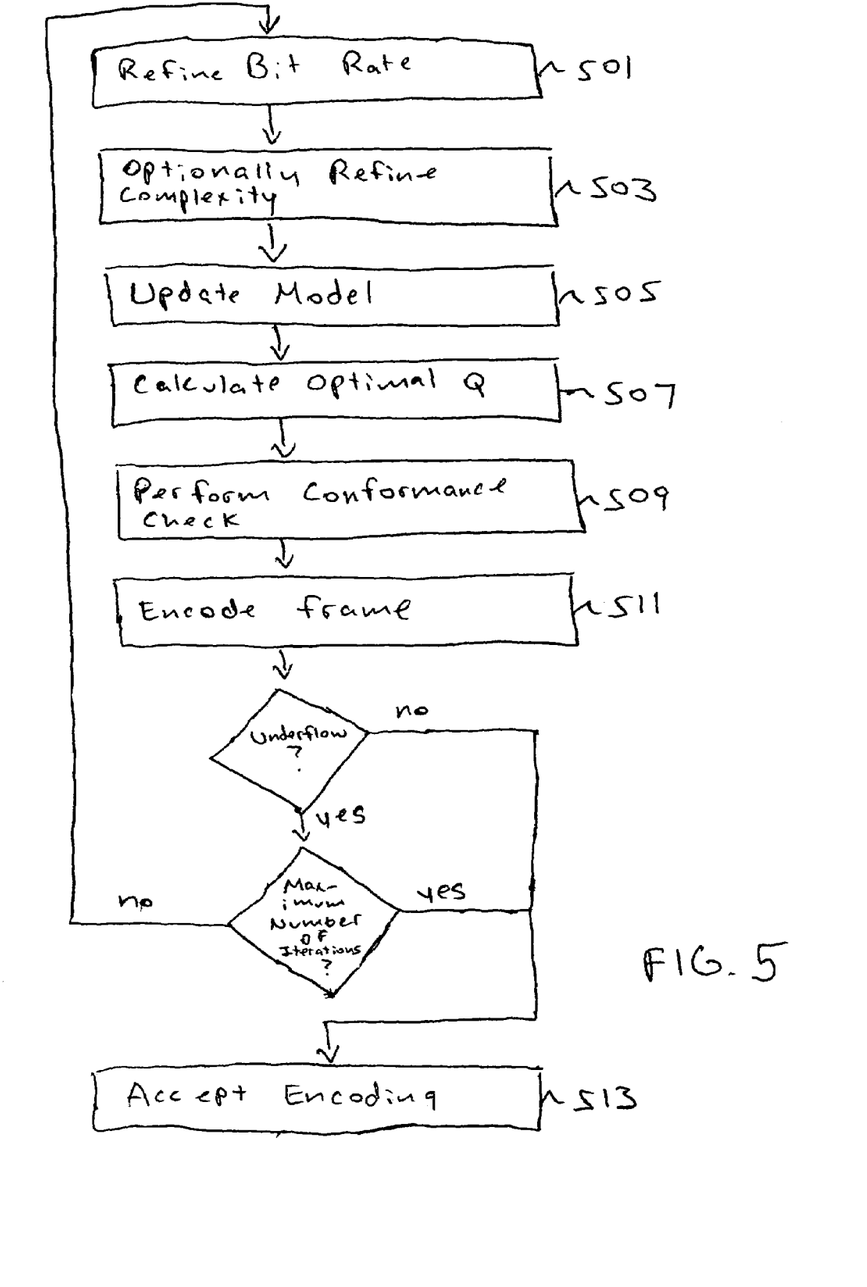
FIG. 5 is a flowchart, illustrating steps for the encoding manager to utilize the rate profile to perform a second-pass encoding of the video sequence, according to another embodiment of the present invention.

FIG. 5 illustrates the encoding manager 101 utilizing the rate profile 108 to perform a second-pass encoding of the video sequence 103, according to another embodiment of the present invention. For each frame of the video sequence 103, the encoding manager 101 refines 501 the bit rate from the rate profile 108. The specific factors to utilize in order to refine 501 the bit rate are a design choice, and can include factors such as the bit deficit for frames encoded so far, the current buffer level, the picture type and transition data. In some embodiments, the encoding manager 101 also refines 503 the complexity for the frame, according to possible factors such as average complexity for frames of the same type already encoded, the complexity of the last frame of this type encoded and the scene transition data. The encoding manager 101 proceeds to update 505 the model for that frame, based on the refined model parameters (e.g., refined bit rate and/or complexity), and uses the updated model to calculate 507 an optimized Q for the frame.

In some embodiments the encoding manager 101 next performs 509 a conformance check on the calculated optimized Q, ensuring that it is within parameters for the video sequence 103, and adjusting it as desired. For example, the encoding manager can ensure that the optimized Q is acceptably similar to (that is, not too varied from) the last frame of the same type (e.g., I frame, P frame, B frame), and/or to the last frame adjusted for type, and/or the last n frames, where the value of n is a variable design choice. The conformance check can also take into account transition data concerning the frame, and adjust the amount of variance to be tolerated accordingly. It is to be understood that the specific parameters utilized to perform 509 a conformance check, as well as the margins of variance to accept therein, are variable design choices.

The encoding manager 101 proceeds to encode 511 the frame according to the optimized Q. The encoding manager 101 then determines whether that frame as encoded according to its optimized Q results in buffer 203 underflow. If not, the encoding manager 101 accepts 513 the encoding of the frame according to its optimized Q as the encoding for that frame. Otherwise, the encoding manager repeats steps 501-511, refining 501, 503 the model parameters as needed until the encoding manager 101 encodes 511 a frame according to an optimized Q such that the encoding does not result in buffer 203 underflow, or the encoding manager 101 encodes 511 the frame according to an optimized Q a maximum number of times. At this point, the encoding manager 101 uses 513 the last encoding of the frame as the encoding for that frame.

As will be understood by those familiar with the art, the invention may be embodied in other specific forms without departing from the spirit or essential characteristics thereof. Likewise, the particular naming and division of the modules, features, attributes, methodologies, managers and other aspects are not mandatory or significant, and the mechanisms that implement the invention or its features may have different names, divisions and/or formats. Furthermore, as will be apparent to one of ordinary skill in the relevant art, the modules, features, attributes, methodologies, managers and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for robust multi-pass variable bit rate video encoding, the method comprising:

an encoding manager performing a first-pass encoding of a video sequence;

the encoding manager collecting data concerning the video sequence during the first-pass encoding;

the encoding manager utilizing collected data to construct a data analysis model concerning the video sequence, the data analysis model comprising at least a frame model concerning each frame of the video sequence, and a sequence model concerning the video sequence as a whole;

the encoding manager utilizing the data analysis model to distinguish between easy and hard segments of the video sequence to determine segment complexity of each segment and to generate a variable bit rate profile for the video sequence, the variable bit rate profile complying with a bit budget for the video sequence, avoiding buffer underflow for each frame of the video sequence, and variably allocating bits to segments as a function of segment complexity; and the encoding manager utilizing the variable bit rate profile to perform a second-pass encoding of the video sequence.

2. The method of claim 1 wherein the encoding manager performing the first-pass encoding of the video sequence comprises the encoding manager performing a step from a group of steps consisting of:

encoding the video sequence with a constant Q, without rate control;

encoding the video sequence utilizing one pass variable bit rate encoding, thereby attempting to achieve a target bit rate; and encoding the video sequence utilizing one pass constant bit rate encoding.

3. The method of claim 1 wherein the encoding manager collecting data concerning the video sequence during the first-pass encoding further comprises:

the encoding manager collecting data to be used to construct a data analysis model concerning the video sequence, the collected data comprising at least one data point concerning each frame of the sequence from a list of data points consisting of:

a picture type;

a bit total;

a DCT bit total;

an average mquant;

an average activity;

a scene change indicator;

a fade indicator;

a still frame indicator; and a transition indicator.

4. The method of claim 1 wherein the encoding manager utilizing collected data to construct a data analysis model concerning the video sequence further comprises:

the encoding manager utilizing collected data to construct a frame model concerning each frame of the video sequence, the frame model comprising a formula expressing a mathematical relationship between frame bit rate, frame complexity, frame Q and frame bit overhead for each frame of the video sequence.

5. The method of claim 4 further comprising:

the encoding manager utilizing collected data to calculate complexity and bit overhead for each frame of the video sequence, and using the calculated values in the frame model.

6. The method of claim 1 wherein the encoding manager utilizing collected data to construct a data analysis model concerning the video sequence and further comprises:

the encoding manager utilizing collected data to construct a sequence model concerning the video sequence as a whole, the sequence model identifying transitions in the video sequence.

7. The method of claim 1 wherein the encoding manager utilizing the data analysis model to generate a rate profile for the video sequence further comprises:
the encoding manager calculating an initial Q for the video sequence as a function of a sum of frame complexity of the frames of the sequence, a sum of bit overhead of the frames of the sequence, and the bit budget for the video sequence.

8. The method of claim 7 further comprising:
the encoding manager calculating an initial bit rate profile for the video sequence by, for each frame of the video sequence, calculating a bit rate for that frame as a function of the calculated initial Q, the complexity of the frame and the bit overhead of the frame.

9. The method of claim 8 further comprising:
the encoding manager adjusting the calculated a bit rate for at least one frame based on at least one factor from a group of factors consisting of:
the calculated bit rate being less than a minimum number of bits for a frame;
the calculated bit rate being at least as few bits as the bit overhead for the frame; and
the frame being a transition frame in the video sequence.

10. The method of claim 8 further comprising:
the encoding manager simulating decoding of at least a portion of the video sequence according to an initial rate profile;
the encoding manager determining whether any frames underflow the buffer;
the encoding manager determining whether any frames overflow the buffer;
responsive to a segment of the video sequence transitioning the buffer from overflow to underflow, the encoding manager classifying that segment as hard;
the encoding manager calculating an updated Q for each hard segment, so as to avoid the underflow of that hard segment; and
the encoding manager calculating an updated Q for the video sequence absent any hard segments, based on the number of bits added to the bit budget as a result of calculating an updated Q for each hard segment; and
the encoding manager reformulating the initial rate profile based on the updated Qs for each hard segment and the updated Q for the video sequence absent any hard segments.

11. The method of claim 10 further comprising:
the encoding manager repeating the steps of claim 10, until a condition occurs from a group of conditions consisting of:
the encoding manager simulating decoding of the video sequence according to an initial rate profile such that the video sequence contains no hard segments; and
the encoding manager simulating decoding of the video sequence a maximum number of times; and;
the encoding manager classifying the rate profile last used to simulate decoding of the video sequence as the generated rate profile for the video sequence.

12. The method of claim 7 or claim 10 further comprising:
the encoding manager calculating a separate Q for I frames, P frames and B frames.

13. The method of claim 1 wherein the encoding manager utilizing the rate profile to perform a second-pass encoding of the video sequence further comprises:
the encoding manager encoding each frame of the video sequence according to a Q calculated for that frame by the encoding manager during rate profile generation; and
the encoding manager determining, for each frame of the video sequence, whether a bit rate for a frame encoded according to the calculated Q is within a margin of error of a bit rate calculated for that frame by the encoding manager during rate profile generation.

14. The method of claim 13 further comprising:
responsive to determining that a bit rate for the frame encoded according to the calculated Q is within a margin of error of the bit rate calculated for that frame during rate profile generation, the encoding manager accepting that encoding for that frame.

15. The method of claim 13 further comprising:
responsive to determining that a bit rate for a frame encoded according to the calculated Q is not within a margin of error of the bit rate calculated for that frame during rate profile generation, the encoding manager:
for each macroblock of that frame, constructing a macroblock model comprising a formula expressing a mathematical relationship between complexity, bit overhead, and updated bit rate, and an updated Q and for that macroblock;
encoding each macroblock according to its corresponding macroblock model; and
collecting modeling data concerning each macroblock during the encoding thereof.

16. The method of claim 15 further comprising:
for each macroblock of the frame, the encoding manager calculating an updated Q for that macroblock as a function of base Q for the macroblocks of the frame remaining to be encoded and the activity mask for that macroblock;
for each macroblock of the frame, the encoding manager calculating an updated bit rate for the macroblock, based on the updated Q, and the complexity and bit overhead of the macroblock according to the last encoding thereof; and
for each macroblock of the frame, after encoding that macroblock, the encoding manager updating, according to the encoding of that macroblock, base Q for the macroblocks of the frame remaining to be encoded.

17. The method of claim 15 further comprising:
the encoding manager repeating the steps of claim 15, until a condition occurs from a group of conditions consisting of:
the encoding manager encoding each macroblock of the frame such that a bit rate for the frame as encoded at a macroblock level is within a margin of error of the bit rate calculated for that frame by the encoding manager during rate profile generation; and
the encoding manager encoding the frame at a macroblock level a maximum number of times; and
the encoding manager accepting the last encoding of the frame at a macroblock level as the encoding for that frame.

18. The method of claim 14 or claim 17 further comprising:
the encoding manager determining whether the encoding of the frame causes underflow; and responsive to determining that the encoding of the frame causes underflow, the encoding manager adjusting the bit rate of the frame so as to eliminate the underflow.

19. The method of claim 1 wherein the encoding manager utilizing the rate profile to perform a second-pass encoding of the video sequence further comprises:
for each frame of the video sequence, the encoding manager performing the following steps:
refining at least one model parameter concerning that frame from a group of model parameters consisting of:
bit rate; and
complexity;
updating the model for that frame based on at least one refined model parameter;
calculating an optimized Q for that frame based on the updated model; and
encoding the frame according to the optimized Q.

20. The method of claim 19 further comprising:
for each frame of the video sequence, the encoding manager ensuring that the optimized Q for that frame conforms to parameters concerning the video sequence.

21. The method of claim 19 further comprising:
for each frame of the video sequence, the encoding manager determining whether that frame as encoded according to an optimized Q results in buffer underflow.

22. The method of claim 21 further comprising:
responsive to determining that encoding a frame according to an optimized Q results in buffer underflow, the encoding manager repeating the steps of claim 19, until a condition occurs from a group of conditions consisting of:
the encoding manager determining that encoding a frame according to an optimized Q does not result in buffer underflow; and
the encoding manager encoding the frame according to an optimized Q a maximum number of times;
and;
the encoding manager accepting the last encoding of the frame as the encoding for that frame.

23. The method of claim 21 further comprising:
the encoding manager determining that encoding a frame according to its optimized Q does not result in buffer underflow; and
the encoding manager accepting the encoding of the frame according to its optimized Q as the encoding for that frame.

24. A system for robust multi-pass variable bit rate video encoding, the system comprising:
a software portion for performing a first-pass encoding of a video sequence;
a software portion for collecting data concerning the video sequence during the first-pass encoding;
a software portion for utilizing collected data to construct a data analysis model concerning the video sequence, the data analysis model comprising at least a frame model concerning each frame of the video sequence, and a sequence model concerning the video sequence as a whole;
a software portion for utilizing the data analysis model to distinguish between easy and hard segments of the video sequence to determine segment complexity of each segment and to generate a variable bit rate profile for the video sequence, the variable bit rate profile complying with a bit budget for the video sequence, avoiding buffer underflow for each frame of the video sequence, and variably allocating bits to segments as a function of segment complexity; and
a software portion for utilizing the variable bit rate profile to perform a second-pass encoding of the video sequence.

25. The system of claim 24 further comprising:
a software portion for encoding each frame of the video sequence according to a Q calculated for that frame by the encoding manager during rate profile generation; and
a software portion for determining, for each frame of the video sequence, whether a bit rate for a frame encoded according to the calculated Q is within a margin of error of a bit rate calculated for that frame by the encoding manager during rate profile generation.

26. The system of claim 24 further comprising:
a software portion for, for each frame of the video sequence:
refining at least one model parameter concerning that frame from a group of model parameters consisting of:
bit rate; and
complexity;
updating the model for that frame based on at least one refined model parameter;
calculating an optimized Q for that frame based on the updated model; and
encoding the frame according to the optimized Q.

27. A system for robust multi-pass variable bit rate video encoding, the system comprising:
means for performing a first-pass encoding of a video sequence;
means for collecting data concerning the video sequence during the first-pass encoding;
means for utilizing collected data to construct a data analysis model concerning the video sequence, the data analysis model comprising at least a frame model concerning each frame of the video sequence, and a sequence model concerning the video sequence as a whole;
means for utilizing the data analysis model to distinguish between easy and hard segments of the video sequence to determine segment complexity of each segment and to generate a variable bit rate profile for the video sequence, the variable bit rate profile complying with a bit budget for the video sequence, avoiding buffer underflow for each frame of the video sequence, and variably allocating bits to segments as a function of segment complexity; and
means for utilizing the variable bit rate profile to perform a second-pass encoding of the video sequence.

28. The system of claim 27 further comprising:
means for encoding each frame of the video sequence according to a Q calculated for that frame by the encoding manager during rate profile generation; and
means for determining, for each frame of the video sequence, whether a bit rate for a frame encoded according to the calculated Q is within a margin of error of a bit rate calculated for that frame by the encoding manager during rate profile generation.

29. The system of claim 27 further comprising:
means for, for each frame of the video sequence:
refining at least one model parameter concerning that frame from a group of model parameters consisting of:
bit rate; and
complexity;

updating the model for that frame based on at least one refined model parameter;

calculating an optimized Q for that frame based on the updated model; and encoding the frame according to the optimized Q.

30. A computer readable medium containing a computer program product for robust multi-pass variable bit rate video encoding, the computer program product comprising:

program code for performing a first-pass encoding of a video sequence;

program code for collecting data concerning the video sequence during the first-pass encoding;

program code for utilizing collected data to construct a data analysis model concerning the video sequence, the data analysis model comprising at least a frame model concerning each frame of the video sequence, and a sequence model concerning the video sequence as a whole;

program code for utilizing the data analysis model to distinguish between easy and hard segments of the video sequence to determine segment complexity of each segment and to generate a variable bit rate profile for the video sequence, the variable bit rate profile complying with a bit budget for the video sequence, avoiding buffer underflow for each frame of the video sequence, and variably allocating bits to segments as a function of segment complexity; and program code for utilizing the variable bit rate profile to perform a second-pass encoding of the video sequence.

31. The computer program product of claim 30 further comprising:

program code for encoding each frame of the video sequence according to a Q calculated for that frame by the encoding manager during rate profile generation; and program code for determining, for each frame of the video sequence, whether a bit rate for a frame encoded according to the calculated Q is within a margin of error of a bit rate calculated for that frame by the encoding manager during rate profile generation.

32. The computer program product of claim 30 further comprising:

program code for, for each frame of the video sequence:

refining at least one model parameter concerning that frame from a group of model parameters consisting of:

bit rate; and complexity;

updating the model for that frame based on at least one refined model parameter;

calculating an optimized Q for that frame based on the updated model; and encoding the frame according to the optimized Q.

* * * * *